(12) United States Patent
Huang

(10) Patent No.: US 12,149,469 B2
(45) Date of Patent: *Nov. 19, 2024

(54) METHOD AND DEVICE FOR INDICATING PT-RS PORT FOR NON-CODEBOOK-BASED UPLINK PUSCH TRANSMISSION, AND BASE STATION

(71) Applicant: SPREADTRUM COMMUNICATIONS (SHANGHAI) CO., LTD., Shanghai (CN)

(72) Inventor: Su Huang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 326 days.

This patent is subject to a terminal disclaimer.

(21) Appl. No.: 17/688,388

(22) Filed: Mar. 7, 2022

(65) Prior Publication Data

US 2022/0190985 A1    Jun. 16, 2022

Related U.S. Application Data

(63) Continuation of application No. 16/968,509, filed as application No. PCT/CN2019/080925 on Apr. 2, 2019, now Pat. No. 11,303,411.

(30) Foreign Application Priority Data

Apr. 3, 2018    (CN) .......................... 201810290173.X

(51) Int. Cl.
   *H04L 5/00*       (2006.01)
   *H04W 72/23*   (2023.01)

(52) U.S. Cl.
   CPC .......... *H04L 5/0048* (2013.01); *H04L 5/0053* (2013.01); *H04L 5/0091* (2013.01); *H04W 72/23* (2023.01)

(58) Field of Classification Search
   CPC ... H04L 5/0048; H04L 5/0053; H04L 5/0091; H04W 72/23
   See application file for complete search history.

(56) References Cited

U.S. PATENT DOCUMENTS

| | | |
|---|---|---|
| 2020/0412503 A1 | 12/2020 | Huang |
| 2021/0036746 A1* | 2/2021 | Liu ...................... H04B 7/0456 |

FOREIGN PATENT DOCUMENTS

| | | |
|---|---|---|
| WO | 2018027222 A1 | 2/2018 |
| WO | 2018044715 A1 | 3/2018 |

OTHER PUBLICATIONS

Qualcomm Incorporated, "DL PTRS Considerations"; 3GPP TSG-RAN WG1 #90, R1-1713410, Aug. 12, 2017, p. 1.

(Continued)

*Primary Examiner* — Ronald B Abelson
(74) *Attorney, Agent, or Firm* — CANTOR COLBURN LLP

(57) ABSTRACT

The present disclosure provides a method and a device for indicating PT-RS port for non-codebook-based uplink PUSCH transmission, and a base station. The method includes: determining a number of bits of a PTRS-DMRS association in a DCI to be transmitted according to a number of SRS resources, a number of PT-RS ports, and a maximum uplink rank number supported by a UE; and transmitting the DCI to the UE, wherein the DCI carries indication bits which have a same number with the bits and apply to indicate an association relationship between the PT-RS ports and the DMRS ports. The present disclosure realizes indication of association relationships between PT-RS ports and DMRS ports in the event of multiple PT-RS ports.

18 Claims, 2 Drawing Sheets

(56) References Cited

OTHER PUBLICATIONS

International Search Report for International Application No. PCT/CN2019/080925; Date of Mailing, Jun. 6, 2019.
USPTO Notice of Allowance for corresponding U.S. Appl. No. 16/968,509, mailed on Dec. 6, 2021.

\* cited by examiner

METHOD AND DEVICE FOR INDICATING PT-RS PORT FOR NON-CODEBOOK-BASED UPLINK PUSCH TRANSMISSION, AND BASE STATION

CROSS-REFERENCE TO RELATED APPLICATIONS

This application is a continuation application of the U.S. patent application Ser. No. 16/968,509, filed on Aug. 7, 2020, the entire contents of which are incorporated herein by reference and priority to which is hereby claimed. The Ser. No. 16/968,509 application is the U.S. National stage of application PCT/CN2019/080925, filed Apr. 2, 2019. Priority under 35 U.S.C. § 119(a) and 35 U.S.C. § 365(b) is hereby claimed from Chinese Patent Application No. 201810290173.X, filed on Apr. 3, 2018, the disclosure of which are both also incorporated herein by reference.

TECHNICAL FIELD

The present disclosure generally relates to wireless communication technology field, and more particularly, to a method and a device for indicating PT-RS port for non-codebook-based uplink PUSCH transmission, and a base station.

BACKGROUND

Non-codebook-based Uplink Physical Uplink Shared Channel (PUSCH) transmission is supported in 5G New Radio (NR), and it includes the following three steps: (1) a base station configures and triggers a User Equipment (UE) to send a plurality of single-port Sounding Reference Signal (SRS) resources; (2) the base station instructs the UE through Downlink Control Information (DCI) to use one or more of the plurality of single-port SRS resources to send PUSCH; and (3) the UE sends the PUSCH.

In the step (2), the DCI also indicates which Demodulation Reference Signal (DMRS) ports of the PUSCH are mapped to the one or more of the plurality of SRS resources. In particular, if a Phase-Tracking Reference Signal (PT-RS) is configured, the base station also tells which one or ones of the DMRS ports the PT-RS is mapped to.

Referring to FIG. 1, the base station indicates that SRS resource 0 and resource 3 are used for PUSCH transmission, DMRS port 0 and port 2 are used, and DMRS port 0 and port 2 are respectively mapped to SRS resource 0 and resource 3. The DCI may also indicate whether the PT-RS is mapped to DMRS port 0 or port 2.

In addition, when multiple SRS resources is configured, the base station may also indicate a radio frequency link on the SRS resources (by indicating the PT-RS). In this way, when the multiple SRS resources configured with the same PT-RS are used to transmit the PUSCH, only one PT-RS needs to be sent, but which DMRS port that the PT-RS will be sent on, needs to be indicated.

Referring to FIG. 2, the base station configures two SRS resources for the UE and the two SRS resources are associated with two different PT-RSs (which means that the two SRS resources can be sent on different radio frequency links). And the DCI indicates to send the PUSCH by using the two SRS resources and to map DMRS port 0 and port 2 of the PUSCH to the two SRS resources respectively. In this way, there is no need for the DCI to indicate the association relationship between the PT-RSs and the DMRS, because the two PT-RS are respectively mapped to the two corresponding DMRS ports.

Referring to FIG. 3, the base station configures four SRS resources for the UE and the four SRS resources are associated with different PT-RSs, wherein SRS resource 0, resource 2 and resource 3 share a PT-RS (the three SRS resources will be sent through a same radio frequency link), and SRS resource 1 uses another PT-RS (which means it will be sent through a different radio frequency link from the other three SRS resources). And the DCI instructs to send the PUSCH by using SRS resources 0 and 3, and maps DMRS port 0 and port 2 of the PUSCH to the two SRS resources, respectively. Since the two SRS resources share a same radio link (namely, a same PT-RS), the DCI needs to additionally indicate which DMRS port the PT-RS is mapped to.

In the existing solutions, a PTRS-DMRS association in DCI format 0_1 is used to perform the indication, but the association in DCI is designed only for the configuration of one PT-RS port, and how the number of SRS resources will affect indication bits of the association is not taken into account, as shown in Table 1.

TABLE 1

| Value | DMRS port |
|---|---|
| 0 | 0 |
| 1 | 1 |
| 2 | 2 |
| 3 | 3 |

SUMMARY

Embodiments of the present disclosure provide a method and a device for indicating PT-RS port for non-codebook-based uplink PUSCH transmission, and a base station, which can indicate an association relationship between PT-RS ports and DMRS ports if there is one or more PT-RS ports.

In an embodiment of the present disclosure, a method for indicating PT-RS port for non-codebook-based uplink PUSCH transmission is provided, including: according to a number of SRS resources, a number of PT-RS ports, and a maximum uplink rank supported by a UE, determining a number of bits of a PTRS-DMRS association in a DCI to be sent; and sending the DCI to the UE, wherein the DCI carries indication bits which have a same number with the bits and apply to indicate an association relationship between the PT-RS ports and the DMRS ports.

In some embodiments, according to a number of SRS resources, a number of PT-RS ports, and a maximum uplink rank supported by a UE, determining a number of bits of a PTRS-DMRS association in a DCI to be sent includes: according to the number of SRS resources, the number of PT-RS ports, the maximum uplink rank supported by the UE and a PT-RS distribution associated with the SRS resources, determining the number of bits of the PTRS-DMRS association in the DCI to be sent.

In some embodiments, the number of SRS resources is a number of SRS resources used for on-codebook-based transmission.

In some embodiments, the number of PT-RS ports is a number of PT-RS ports configured by a Radio Resource Control (RRC) signaling or a total number of PT-RSs associated with the SRS resources.

In some embodiments, when the number of bits is determined to be one, and if there are SRS resources to which two DMRS ports are mapped sharing a same PT-RS, the indication bit carried in the DCI is used to indicate which one of the two DMRS ports the same PT-RS is associated with.

In some embodiments, when the number of bits is determined to be two, and if there are SRS resources to which two DMRS ports are mapped sharing a same PT-RS, one indication bit of the indication bits carried in the DCI is used to indicate which one of the two DMRS ports the same PT-RS is associated with; if there are SRS resources to which three DMRS ports are mapped sharing a same PT-RS, two indication bits of the indication bits carried in the DCI is used to indicate which one of the three DMRS ports the same PT-RS is associated with; and if there are SRS resources to which four DMRS ports are mapped sharing a same PT-RS, two indication bits of the indication bits carried in the DCI is used to indicate which one of the four DMRS ports the same PT-RS is associated with.

In some embodiments, when the number of bits is determined to be two, and if there are SRS resources to which two DMRS ports are mapped sharing a first PT-RS and there are SRS resources to which another two DMRS ports are mapped sharing a second PT-RS, one indication bit of the indication bits carried in the DCI is used to indicate which one of the two DMRS ports the first PT-RS is associated with and the other indication bit of the indication bits carried in the DCI is used to indicate which one of the another two DMRS ports the second PT-RS is associated with.

In an embodiment of the present disclosure, a device for indicating PT-RS port for non-codebook-based uplink PUSCH transmission is provided, including: a determination unit, configured to determine a number of bits of a PTRS-DMRS association in a DCI to be sent, according to a number of SRS resources, a number of PT-RS ports, and a maximum uplink rank supported by a UE; and a transmission unit, configured to send the DCI to the UE, wherein the DCI carries indication bits which have a same number with the bits and apply to indicate an association relationship between the PT-RS ports and the DMRS ports.

In some embodiments, the determination unit is configured to determine the number of bits of the PTRS-DMRS association in the DCI to be sent according to the number of the SRS resources, the number of the PT-RS ports, the maximum uplink rank supported by the UE and a PT-RS distribution associated with the SRS resources.

In some embodiments, the number of SRS resources is a number of SRS resources used for non-codebook-based transmission.

In some embodiments, the number of PT-RS ports is a number of PT-RS ports configured by a RRC signaling or a total number of PT-RSs associated with the SRS resources.

In some embodiments, when the number of bits is determined to be one, and if there are SRS resources to which two DMRS ports are mapped sharing a same PT-RS, the indication bit carried in the DCI is used to indicate which one of the two DMRS ports the same PT-RS is associated with.

In some embodiments, when the number of bits is determined to be two, and if there are SRS resources to which two DMRS ports are mapped sharing a same PT-RS, one indication bit of the indication bits carried in the DCI is used to indicate which one of the two DMRS ports the same PT-RS is associated with; if there are SRS resources to which three DMRS ports are mapped sharing a same PT-RS, two indication bits of the indication bits carried in the DCI is used to indicate which one of the three DMRS ports the same PT-RS is associated with; and if there are SRS resources to which four DMRS ports are mapped sharing a same PT-RS, two indication bits of the indication bits carried in the DCI is used to indicate which one of the four DMRS ports the same PT-RS is associated with.

In some embodiments, when the number of bits is determined to be two, and if there are SRS resources to which two DMRS ports are mapped sharing a first PT-RS and there are SRS resources to which another two DMRS ports are mapped sharing a second PT-RS, one indication bit of the indication bits carried in the DCI is used to indicate which one of the two DMRS ports the first PT-RS is associated with and the other indication bit of the indication bits carried in the DCI is used to indicate which one of the another two DMRS ports the second PT-RS is associated with.

In an embodiment of the present disclosure, a base station is provided, wherein the base station having a device for indicating PT-RS port for non-codebook-based uplink PUSCH transmission described above.

Embodiments of the present disclosure provide a method and a device for indicating PT-RS port for non-codebook-based uplink PUSCH transmission, and a base station. According to embodiments of the present disclosure, a number of bits of a PTRS-DMRS association in a DCI to be sent is determined according to a number of SRS resources, a number of PT-RS ports, and a maximum uplink rank supported by a UE. The DCI is sent to the UE, wherein the DCI carries indication bits which have a same number with the bits and apply to indicate an association relationship between the PT-RS ports and the DMRS ports. Therefore, if there are SRS resources to which multiple DMRS ports are mapped sharing a PT-RS, an association relationship between the PT-RS ports and the DMRS ports can be indicated.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall be within the protection scope of the present invention.

Figure 1:
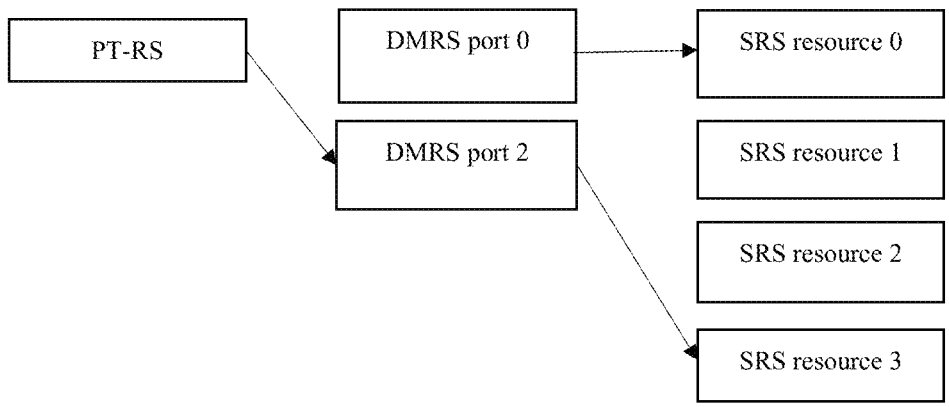
FIG. 1 schematically illustrates a RS port mapping method in non-codebook-based uplink PUSCH transmission.
Figure 2:
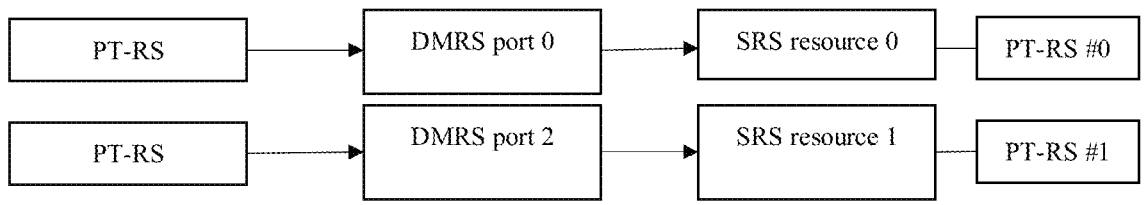
FIG. 2 schematically illustrates two SRS resources which are used for sending PUSCH associated with different PT-RSs.
Figure 3:
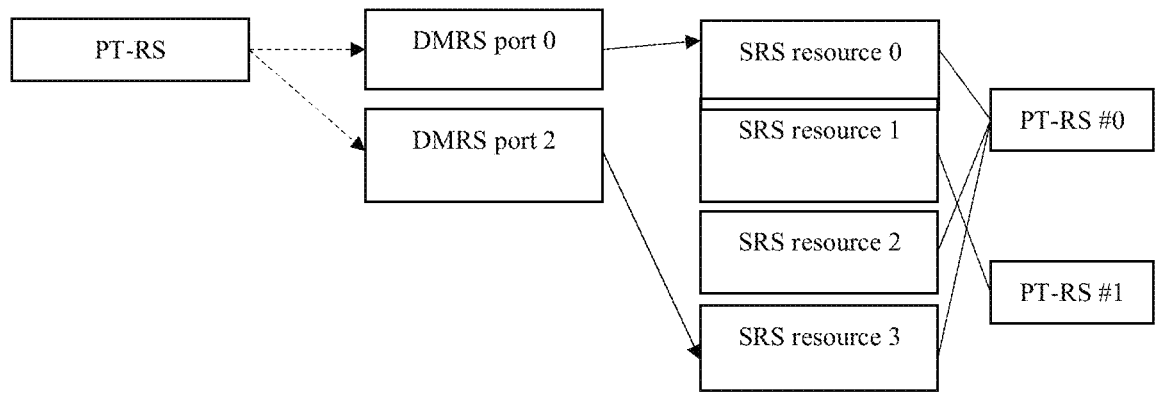
FIG. 3 schematically illustrates two SRS resources which are used for sending PUSCH associated with a same PT-RS.
Figure 4:
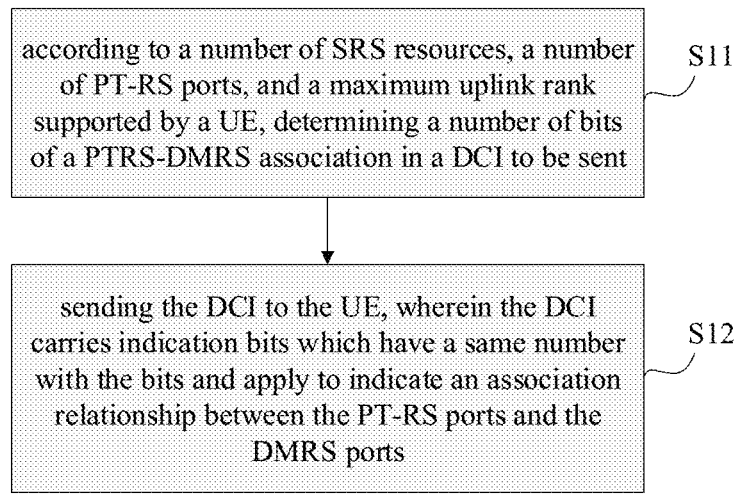
FIG. 4 schematically illustrates a flow chart of a method for indicating PT-RS port for non-codebook-based uplink PUSCH transmission according to an embodiment.

In an embodiment of the present disclosure, a method for indicating PT-RS port for non-codebook-based uplink PUSCH transmission is provided. Referring to FIG. 4, the method includes S11 and S12.

In S11, a base station determines a number of bits of a PTRS-DMRS association in a DCI to be sent according to a number of SRS resources, a number of PT-RS ports, and a maximum uplink rank supported by a UE.

In some embodiments, the number of SRS resources is a number of SRS resources used for non-codebook-based transmission.

In some embodiments, the number of PT-RS ports is a number of PT-RS ports configured by a RRC signaling or a total number of PT-RSs associated with the SRS resources.

In S12, the base station sends the DCI to the UE, wherein the DCI carries indication bits which have a same number with the bits and apply to indicate an association relationship between the PT-RS ports and the DMRS ports.

Embodiments of the present disclosure provide a method for indicating PT-RS port for non-codebook-based uplink PUSCH transmission. According to embodiments of the present disclosure, a number of bits of a PTRS-DMRS association in a DCI to be sent is determined according to a number of SRS resources, a number of PT-RS ports, and a maximum uplink rank supported by a UE. The DCI is sent to the UE, wherein the DCI carries indication bits which have a same number with the bits and apply to indicate an association relationship between the PT-RS ports and the DMRS ports. Therefore, if there are SRS resources to which multiple DMRS ports are mapped sharing a PT-RS, an association relationship between the PT-RS ports and the DMRS ports can be indicated.

In some embodiments, the base station may determine the number of bits of the PTRS-DMRS association in the DCI to be transmitted according to Table 2.

TABLE 2

| a number of SRS resources | a number of PT-RS ports | a maximum uplink rank $L_{max}$ supported by a UE | a number of bits of a PTRS-DMRS association |
|---|---|---|---|
| 1 | 1 | 1 | 0 |
| 2 | 1 | 1 | 0 |
|   |   | 2 | 1 |
|   | 2 | 1 | 0 |
|   |   | 2 | 0 |
| 3 | 1 | 1 | 0 |
|   |   | 2 | 1 |
|   |   | 3 | 2 |
|   | 2 | 1 | 0 |
|   |   | 2 | 1 |
|   |   | 3 | 1 |

TABLE 2-continued

| a number of SRS resources | a number of PT-RS ports | a maximum uplink rank $L_{max}$ supported by a UE | a number of bits of a PTRS-DMRS association |
|---|---|---|---|
| 4 | 1 | 1 | 0 |
|   |   | 2 | 1 |
|   |   | 3 | 2 |
|   |   | 4 | 2 |
|   | 2 | 1 | 0 |
|   |   | 2 | 1 |
|   |   | 3 | 2 |
|   |   | 4 | 2 |

In some embodiments, the base station may determine the number of bits of the PTRS-DMRS association in the DCI to be transmitted according to Table 3.

TABLE 3

| a number of SRS resources | a number of PT-RS ports | a maximum uplink rank $L_{max}$ supported by a UE | a number of bits of a PTRS-DMRS association |
|---|---|---|---|
| 1 | 1 | 1 | 0 |
| 2 | 1 | 1 | 0 |
|   |   | 2 | 1 |
|   | 2 | 1 | 0 |
|   |   | 2 | 0 |
| 3 | 1 | 1 | 0 |
|   |   | 2 | 1 |
|   |   | 3 | 2 |
|   | 2 | 1 | 0 |
|   |   | 2 | 1 |
|   |   | 3 | 1 |
| 4 | 1 | 1 | 0 |
|   |   | 2 | 1 |
|   |   | 3 | 2 |
|   |   | 4 | 2 |
|   | 2 | 1 | 0 |
|   |   | 2 | 1 |
|   |   | 3 | 1 |
|   |   | 4 | 2 |

In some embodiments, the base station may determine the number of bits of the PTRS-DMRS association in the DCI to be sent according to the number of SRS resources, the number of PT-RS ports, the maximum uplink rank supported by the UE and a PT-RS distribution associated with the SRS resources.

In some embodiments, the base station may determine the number of bits of the PTRS-DMRS association in the DCI to be transmitted according to Table 4.

TABLE 4

| a number of SRS resources | a number of PT-RS ports | a maximum uplink rank $L_{max}$ supported by a UE | a PT-RS distribution associated with SRS resources | a number of bits of a PTRS-DMRS association |
|---|---|---|---|---|
| 1 | 1 | 1 |   | 0 |
| 2 | 1 | 1 |   | 0 |
|   |   | 2 |   | 1 |
|   | 2 | 1 |   | 0 |
|   |   | 2 |   | 0 |
| 3 | 1 | 1 |   | 0 |
|   |   | 2 |   | 1 |
|   |   | 3 |   | 2 |
|   | 2 | 1 |   | 0 |
|   |   | 2 |   | 1 |
|   |   | 3 |   | 1 |

TABLE 4-continued

| a number of SRS resources | a number of PT-RS ports | a maximum uplink rank $L_{max}$ supported by a UE | a PT-RS distribution associated with SRS resources | a number of bits of a PTRS-DMRS association |
|---|---|---|---|---|
| 4 | 1 | 1 | | 0 |
| | | 2 | | 1 |
| | | 3 | | 2 |
| | | 4 | | 2 |
| | 2 | 1 | | 0 |
| | | 2 | | 1 |
| | | 3 | each of two PT-RSs is associated with two SRS resources (2 + 2) | 1 |
| | | | one of two PT-RSs is associated with 3 SRS resources and one is associated with 1 SRS resource (3 + 1) | 2 |
| | | 4 | | 2 |

Referring to Table 2, Table 3 and Table 4, when the number of bits is determined to be zero, PT-RS actually transmitted is one-to-one mapped to scheduled DMRS port.

Referring to Table 2, Table 3 and Table 4, when the number of bits is determined to be one, and if there are SRS resources to which two DMRS ports are mapped sharing a same PT-RS, the indication bit carried in the DCI is used to indicate which one of the two DMRS ports the same PT-RS is associated with. Otherwise, the value of the indication bit does not affect the association between the PT-RS and the DMRS ports.

Referring to Table 2, Table 3 and Table 4, when the number of bits is determined to be two, and if there are SRS resources to which two DMRS ports are mapped sharing a same PT-RS, one indication bit of the indication bits carried in the DCI is used to indicate which one of the two DMRS ports the same PT-RS is associated with.

When the number of bits is determined to be two, and if there are SRS resources to which two DMRS ports are mapped sharing a first PT-RS and there are SRS resources to which another two DMRS ports are mapped sharing a second PT-RS, one indication bit of the indication bits carried in the DCI is used to indicate which one of the two DMRS ports the first PT-RS is associated with and the other indication bit of the indication bits carried in the DCI is used to indicate which one of the another two DMRS ports the second PT-RS is associated with.

When the number of bits is determined to be two, and if there are SRS resources to which three DMRS ports are mapped sharing a same PT-RS, two indication bits of the indication bits carried in the DCI is used to indicate which one of the three DMRS ports the same PT-RS is associated with.

When the number of bits is determined to be two, and if there are SRS resources to which four DMRS ports are mapped sharing a same PT-RS, two indication bits of the indication bits carried in the DCI is used to indicate which one of the four DMRS ports the same PT-RS is associated with.

Figure 5:
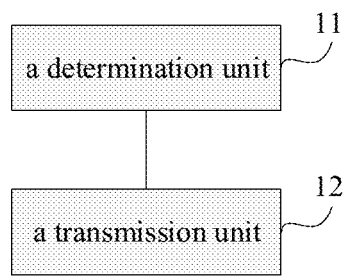
FIG. 5 schematically illustrates a structural diagram of a device for indicating PT-RS port for non-codebook-based uplink PUSCH transmission according to an embodiment.

In an embodiment of the present disclosure, a device for indicating PT-RS port for non-codebook-based uplink PUSCH transmission is provided. Referring to FIG. 5, the device includes: a determination unit 11, configured to determine a number of bits of a PTRS-DMRS association in a DCI to be sent, according to a number of SRS resources, a number of PT-RS ports, and a maximum uplink rank supported by a UE; and a transmission unit 12, configured to send the DCI to the UE, wherein the DCI carries indication bits which have a same number with the bits and apply to indicate an association relationship between the PT-RS ports and the DMRS ports.

In some embodiments, the determination unit 11 is configured to determine the number of bits of the PTRS-DMRS association in the DCI to be sent according to the number of the SRS resources, the number of the PT-RS ports, the maximum uplink rank supported by the UE and a PT-RS distribution associated with the SRS resources.

In some embodiments, the number of SRS resources is a number of SRS resources used for non-codebook-based transmission.

In some embodiments, the number of PT-RS ports is a number of PT-RS ports configured by a RRC signaling or a total number of PT-RSs associated with the SRS resources.

In some embodiments, when the number of bits is determined to be one, and if there are SRS resources to which two DMRS ports are mapped sharing a same PT-RS, the indication bit carried in the DCI is used to indicate which one of the two DMRS ports the same PT-RS is associated with.

In some embodiments, when the number of bits is determined to be two, and if there are SRS resources to which two DMRS ports are mapped sharing a same PT-RS, one indication bit of the indication bits carried in the DCI is used to indicate which one of the two DMRS ports the same PT-RS is associated with; if there are SRS resources to which three DMRS ports are mapped sharing a same PT-RS, two indication bits of the indication bits carried in the DCI is used to indicate which one of the three DMRS ports the same PT-RS is associated with; and if there are SRS resources to which four DMRS ports are mapped sharing a same PT-RS, two indication bits of the indication bits carried in the DCI is used to indicate which one of the four DMRS ports the same PT-RS is associated with.

In some embodiments, when the number of bits is determined to be two, and if there are SRS resources to which two DMRS ports are mapped sharing a first PT-RS and there are SRS resources to which another two DMRS ports are mapped sharing a second PT-RS, one indication bit of the indication bits carried in the DCI is used to indicate which one of the two DMRS ports the first PT-RS is associated with and the other indication bit of the indication bits carried in the DCI is used to indicate which one of the another two DMRS ports the second PT-RS is associated with.

Embodiments of the present disclosure provide a device for indicating PT-RS port for non-codebook-based uplink PUSCH transmission. According to embodiments of the present disclosure, a number of bits of a PTRS-DMRS association in a DCI to be sent is determined according to a number of SRS resources, a number of PT-RS ports, and a maximum uplink rank supported by a UE. The DCI is sent to the UE, wherein the DCI carries indication bits which have a same number with the bits and apply to indicate an association relationship between the PT-RS ports and the DMRS ports. Therefore, if there are SRS resources to which multiple DMRS ports are mapped sharing a PT-RS, an association relationship between the PT-RS ports and the DMRS ports can be indicated.

The device provided in embodiments of the present disclosure is configured to perform the technical solutions of the method provided in embodiments of the present disclosure described above. Implementation principles and technical effects are similar, and details are not described herein again.

In an embodiment of the present disclosure, a base station is provided, wherein the base station having a device for indicating PT-RS port for non-codebook-based uplink PUSCH transmission described above.

Those skilled in the art can understand that a part or all of the methods described in the embodiments of the present disclosure can be performed by a computer program instructing a related hardware. The computer program can be stored in a computer-readable storage medium, and when the computer program is executed, the computer program can include processes of the foregoing methods described in the embodiment. The storage medium may be a magnetic disk, an optical disk, a Read-Only Memory (ROM), or a Random Access Memory (RAM), etc.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for indicating PT-RS port for non-codebook-based uplink PUSCH transmission, comprising:
   receiving DCI from a base station, wherein the DCI carries indication bits which have a same number with bits of a PTRS-DMRS association in the DCI and apply to indicate an association relationship between PT-RS ports and DMRS ports, wherein the number of the bits of the PTRS-DMRS association in the DCI is determined by the base station based on a number of SRS resources, a number of the PT-RS ports, and a maximum uplink rank supported by a UE.

2. The method according to claim 1, wherein the number of the bits of the PTRS-DMRS association in the DCI is determined by the base station further based on a PT-RS distribution associated with the SRS resources.

3. The method according to claim 1, wherein the number of the SRS resources is a number of SRS resources used for non-codebook-based transmission.

4. The method according to claim 2, wherein the number of the SRS resources is a number of SRS resources used for non-codebook-based transmission.

5. The method according to claim 1, wherein the number of the PT-RS ports is a number of PT-RS ports configured by a Radio Resource Control (RRC) signaling.

6. The method according to claim 2, wherein the number of the PT-RS ports is a number of PT-RS ports configured by an RRC signaling.

7. The method according to claim 1, wherein the number of the PT-RS ports is a total number of PT-RSs associated with the SRS resources.

8. The method according to claim 2, wherein the number of the PT-RS ports is a total number of PT-RSs associated with the SRS resources.

9. The method according to claim 1, wherein based on the number of the bits of the PTRS-DMRS association in the DCI being one, and SRS resources to which two DMRS ports are mapped sharing a same PT-RS, the indication bit carried in the DCI is used to indicate which one of the two DMRS ports the same PT-RS is associated with.

10. The method according to claim 2, wherein based on the number of the bits of the PTRS-DMRS association in the DCI being one, and SRS resources to which two DMRS ports are mapped sharing a same PT-RS, the indication bit carried in the DCI is used to indicate which one of the two DMRS ports the same PT-RS is associated with.

11. The method according to claim 1, wherein based on the number of the bits of the PTRS-DMRS association in the DCI being two, and SRS resources to which two DMRS ports are mapped sharing a same PT-RS, one indication bit of the indication bits carried in the DCI is used to indicate which one of the two DMRS ports the same PT-RS is associated with.

12. The method according to claim 2, wherein based on the number of the bits of the PTRS-DMRS association in the DCI being two, and SRS resources to which two DMRS ports are mapped sharing a same PT-RS, one indication bit of the indication bits carried in the DCI is used to indicate which one of the two DMRS ports the same PT-RS is associated with.

13. The method according to claim 1, wherein based on the number of the bits of the PTRS-DMRS association in the DCI being two, and SRS resources to which three DMRS ports are mapped sharing a same PT-RS, two indication bits of the indication bits carried in the DCI is used to indicate which one of the three DMRS ports the same PT-RS is associated with.

14. The method according to claim 2, wherein based on the number of the bits of the PTRS-DMRS association in the DCI being two, and SRS resources to which three DMRS ports are mapped sharing a same PT-RS, two indication bits of the indication bits carried in the DCI is used to indicate which one of the three DMRS ports the same PT-RS is associated with.

15. The method according to claim 1, wherein based on the number of the bits of the PTRS-DMRS association in the DCI being two, and SRS resources to which four DMRS ports are mapped sharing a same PT-RS, two indication bits of the indication bits carried in the DCI is used to indicate which one of the four DMRS ports the same PT-RS is associated with.

16. The method according to claim 2, wherein based on the number of the bits of the PTRS-DMRS association in the DCI being two, and SRS resources to which four DMRS ports are mapped sharing a same PT-RS, two indication bits of the indication bits carried in the DCI is used to indicate which one of the four DMRS ports the same PT-RS is associated with.

17. The method according to claim 1, wherein based on the number of the bits of the PTRS-DMRS association in the DCI being two, SRS resources to which two DMRS ports are mapped sharing a first PT-RS, and SRS resources to which another two DMRS ports are mapped sharing a second PT-RS, one indication bit of the indication bits carried in the DCI is used to indicate which one of the two DMRS ports the first PT-RS is associated with, and the other indication bit of the indication bits carried in the DCI is used to indicate which one of the another two DMRS ports the second PT-RS is associated with.

18. The method according to claim 2, wherein based on the number of the bits of the PTRS-DMRS association in the DCI being two, SRS resources to which two DMRS ports are mapped sharing a first PT-RS, and SRS resources to which another two DMRS ports are mapped sharing a second PT-RS, one indication bit of the indication bits carried in the DCI is used to indicate which one of the two DMRS ports the first PT-RS is associated with, and the other indication bit of the indication bits carried in the DCI is used to indicate which one of the another two DMRS ports the second PT-RS is associated with.

\* \* \* \* \*